(12) United States Patent
Koshida et al.

(10) Patent No.: US 7,485,675 B2
(45) Date of Patent: *Feb. 3, 2009

(54) COLORED THERMOPLASTIC RESIN COMPOSITIONS FOR LASER WELDING, SPECIFIC NEUTRAL ANTHRAQUINONE DYES AS COLORANTS THEREFOR, AND MOLDED PRODUCT THEREFROM

(75) Inventors: Reiko Koshida, Utsunomiya (JP); Yoshiteru Hatase, Osaka (JP); Ryuichi Hayashi, Tokyo (JP); Hiroyuki Sumi, Tochigi-ken (JP)

(73) Assignee: E.I. du Pont de Nemours and Company, Wilmington, DE (US)

( * ) Notice: Subject to any disclaimer, the term of this patent is extended or adjusted under 35 U.S.C. 154(b) by 459 days.

This patent is subject to a terminal disclaimer.

(21) Appl. No.: 11/135,782

(22) Filed: May 23, 2005

(65) Prior Publication Data

US 2005/0228085 A1    Oct. 13, 2005

(51) Int. Cl.
*C08K 5/08*    (2006.01)
*C08K 5/23*    (2006.01)
*C08K 5/34*    (2006.01)

(52) U.S. Cl. .......... 524/358; 524/90; 524/190; 524/195; 106/494; 106/496; 106/498

(58) Field of Classification Search .......... 524/90, 524/190, 195, 358; 106/494, 496, 498
See application file for complete search history.

(56) References Cited

U.S. PATENT DOCUMENTS

| | | | |
|---|---|---|---|
| 4,755,012 A | 7/1988 | Kojima | |
| 5,893,959 A | 4/1999 | Muellich | |
| 5,968,688 A | 10/1999 | Masuda | |
| 5,973,038 A | 10/1999 | Weaver | |
| 6,759,458 B2 * | 7/2004 | Reil | 524/89 |
| 2002/0002225 A1 | 1/2002 | Rell | |
| 2005/0009558 A1 * | 1/2005 | Kashima | 455/550.1 |

* cited by examiner

Primary Examiner—Tae H Yoon (57) ABSTRACT

Thermoplastic resin compositions suitable for laser welding are disclosed, which include a mixture of neutral anthraquinone dyes and at least one other red dye to absorb and transmit select regions of visible light and to enhance weldability.

8 Claims, 2 Drawing Sheets

COLORED THERMOPLASTIC RESIN COMPOSITIONS FOR LASER WELDING, SPECIFIC NEUTRAL ANTHRAQUINONE DYES AS COLORANTS THEREFOR, AND MOLDED PRODUCT THEREFROM

This application is a continuation of U.S. application Ser. No. 10/053,074, filed Nov. 13, 2001, and claims the benefit of priority of U.S. Provisional Application No. 60/247,647, filed Nov. 13, 2000.

FIELD OF THE INVENTION

The present invention relates to thermoplastic resin compositions with specific anthraquinone dyes. More particularly, the inventions relates to such compositions having improved laser weldability.

BACKGROUND OF THE INVENTION

It is known in the art to join together two articles made of resins (and respectively opaque and transparent) by positioning them in contact with each other, transmitting a predetermined amount of laser beam focused on the junction of them and causing the junction portion to be melted and joined together ("laser welding"). Several advantages flow from laser welding versus conventional methods of joining plastic parts. For example, laser welding is widely known for its simple operation, labor savings, improvement of productivity, clear joints, and reduction of production cost. It is useful in various applications including the preparation of molded articles, including hollow shapes, in automobile industries and electric and electronic industries. Recently, work has intensified in the area of blends of thermoplastic resin and a colorant containing an organic dye or pigment. Better control of the conversion of laser energy to heat is achieved by the addition of such colorants to the resins. Laser beams penetrate through transparent articles positioned closer to the laser beam source, and are largely absorbed in the opaque article, which has a relatively higher absorption coefficient in comparison with the aforementioned transparent article. Careful attention to the amount of the colorants therein results in the junction portion being melted and the articles joined together.

See for example Japanese Published (Koukoku) Patent No.62-49850 and Japanese Published (Koukoku) Patent No.5 (93)-42336. Other resin compositions associated with the laser welding are described in U.S. Pat. No. 5,893,959 which discloses transparent and opaque workpiece parts welded together by a laser beam along a joining zone. Both parts contain black dye pigments such as carbon black to cause them to offer a substantially homogenous visual impression even after welding.

Other illustrations of the laser welding of compositions are found in U.S. Pat. No. 5,893,959. For example, the color of the thermoplastic components may be black (carbon black or nigrosine) which is commonly and widely used in the automobile industry among other applications. However, carbon black and nigrosine cannot transmit a laser beam with a main wavelength in the infra-red region (1200 nm to 800 nm), such as Nd:YAG laser and a diode laser, both of which are of wide use in industries.

Surprisingly, it has now been found that thermoplastic resin compositions both black in appearance can be used for laser-welded molded articles, and for both the transparent and opaque parts subjected to the laser beam. A significantly improved transmission to near-infrared light of the laser beam, with excellent and balanced heat-resistance and mechanical properties as required in automobile application, is achieved by including a specific weight percentage of black dyes.

The object of the present invention is to offer a thermoplastic resin composition capable of offering moldings which appear in black, are transparent to a laser beam, in particular to the near-infrared light region. A feature of the invention is the compositions herein can provide a substantially homogenous visual black impression of transparent and opaque articles that appears in black and absorbs the laser beam largely by containing black dyes, welded together by the laser beam, and possess excellent and balanced heat-resistance and mechanical properties as required in automotive parts, electric/electronic components, mechanical components, and many other applications. The aforementioned objects, features and advantages will become better understood upon having reference to the following description of the invention herein.

SUMMARY OF THE INVENTION

There is disclosed and claimed herein thermoplastic resin compositions for laser welding comprising a laser transmitting black colorant comprising a mixture of a) neutral anthraquinone dyes which impart colors of blue, violet or green, absorb visible light with a wavelength at less than 700 nm in the visible light region and transmit a laser beam with a wavelength at 800 nm to 1200 nm in the infra-red region with b) at least one other red dye which transmits the laser beam with a wavelength at 800 nm to 1200 nm in the infra-red region. As red dyes, perinone dyes, monoazo complex dyes or disazo dyes may be used.

Using these components, thermoplastic resin compositions for laser welding can be obtained having improvements in moldability, solubility in the thermoplastic resin, bleeding- and blooming-resistance as well as transparency to wavelength of a laser beam at 800 nm to 1200 nm and resistance to chemicals.

The compositions of the invention may also contain other yellow dyes in addition to the mixture of anthraquinone dyes with red dyes as one of components of black dyes used as a colorant of the composition. Preferably anthraquinone yellow dyes are used.

The actual amount of respective dyes which are useful in the practice of the invention will depend upon kind of thermoplastic resins blended with the dyes, the desired colors, the desired depth of shade and thickness of molded articles of the composition of the invention. For instance, in the case of coloring the articles, whether thin or thick, the amount of dyes is adjusted while paying attention to the transmission properties. The actual amount used depends on the kind of dyes used, as will be appreciated by those having skill in this field.

BRIEF DESCRIPTION OF THE DRAWINGS

The invention will be better understood upon having reference to the drawings herein.

DETAILED DESCRIPTION OF THE INVENTION

A black colorant of the compositions of the invention comprises a mixture of neutral anthraquinone dyes which impart colors of blue, violet or green, absorb less than 700 nm in the visible light region and transmit at 800 nm to 1200 nm in the infra-red region, combined with at least other red dyes which transmit at 800 nm to 1200 nm in infra-red region, such as perinone dyes, monoazo complex dyes or disazo dyes, at predetermined weight ratios. The weight ratios depend on colorant combination.

There are many examples of combinations of mixed dyes useful in this invention. For instance, the combination of blue dye, red dye and yellow dye; the combination of green dye, red dye and yellow dye; the combination of blue dye, green dye and red dye and yellow dye; and the combination of green dye, violet dye and yellow dye can be used.

The neutral anthraquinone dye described above which can be a component of the black dyes in the invention may be selected from the group consisting of the following dyes described in the Color Index below in Table 1.

Generally, the dyes which exhibit blue, violet and green colorant can be main components to produce the black dyes. Neutral anthraquinone dye imparting blue, violet or green is a major component of the resulting black colorant by being mixed with red and then yellow dyes.

TABLE 1

Anthraquinone green dye:

C.I. Solvent Green, 3, 5, 6, 7, 19, 20, 22, 23, 24, 25, 26, 28, 29

Anthraquinone blue dyes:

C.I. Solvent Blue 11, 12, 13, 14, 16, 17, 18, 19, 20, 21, 35, 36, 40, 41, 45, 58, 59, 63, 65, 68, 69, 74, 76, 78, 79, 80, 82, 83, 84, 85, 86, 87, 90, 91, 92, 93, 94, 95, 96, 97, 98, 101, 102, 103, 104, 105, 106, 107, 108, 109, 110, 111, 112, 113, 114, 116, 119, 120, 121, 122, 123, 126, 128, 130, 132, 134, 136, 139 and C.I. Vat Blue 4, 6, 11, 12, 13, 14.

Anthraquinone violet dyes:

C.I. Solvent Violet 11, 12, 13, 14, 15, 26, 28, 30, 31, 33, 34, 36, 37, 38, 40, 41, 42.

Examples of the neutral anthraquinone dyes having the above-mentioned properties and used as the main component for the formation of the black dye contained in the composition of the invention can be represented by the following formula [I] (and illustrated in Table 2 below) or formula [II-a] or formula [II-b].

TABLE 2

Formula [I]

Pro.
Ex. No. $R^1, R^2, R^3, R^4, R^5, R^6, R^7, R^8$

I-1  $R^2 = R^3 = R^4 = R^5 = R^6 = R^7 = R^8 = H$, $R^1$ = methylanilino

I-2  $R^2 = R^3 = R^5 = R^6 = R^7 = R^8 = H$, $R^4 = OH$,
     $R^1$ = methylanilino I-3  $R^2 = R^3 = R^5 = R^6 = R^7 = R^8 = H$, $R^4 = NH_2$, $R^1$ = anilino I-4  $R^2 = R^3 = R^5 = R^6 = R^7 = R^8 = H$, $R^4 = OCH_3$,
     $R^1$ = benzoylamido I-5  $R^2 = R^3 = R^6 = R^7 = R^8 = H$, $R^4 = R^5 = OH$,
     $R^8 = NO_2$, $R^1$ = ethylanilino

I-6  $R^2 = R^3 = R^5 = R^6 = R^7 = R^8 = H$, $R^1 = R^4 = NH_2$

I-7  $R^2 = R^3 = R^5 = R^6 = R^7 = R^8 = H$, $R^4 = NH_2$,
     $R^1$ = Cyclohexyl amido

I-8  $R^2 = R^3 = R^5 = R^6 = R^7 = R^8 = H$, $R^4 = NH_2$, $R^1 = CH_3NH$

I-9  $R^2 = R^3 = R^5 = R^6 = R^7 = R^8 = H$, $R^1 = R^4 = C_4H_9NH$

I-10 $R^2 = R^3 = R^5 = R^6 = R^7 = R^8 = H$, $R^4 = CH_3NH$,
     $R^1$ = methylanilino

I-11 $R^2 = R^3 = R^5 = R^6 = R^7 = R^8 = H$, $R^1 = R^4 = C_5H_{11}NH$

I-12 $R^2 = R^3 = R^5 = R^6 = R^7 = R^8 = H$, $R^1 = R^4$ = methylanilino

I-13 $R^2 = R^3 = R^4 = R^5 = R^6 = R^7 = H$, $R^1 = R^8$ = methylanilino

I-14 $R^2 = R^3 = R^4 = R^6 = R^7 = R^8 = H$, $R^1 = R^5$ = methylanilino

I-15 $R^5 = R^6 = R^7 = R^7 = H$, $R^1 = R^4 = NH_2$,
     $R^2 = R^3$ = phenyloxy

I-16 $R^3 = R^5 = R^6 = R^7 = R^8 = H$, $R^1 = NH_2$, $R^2 = CH_3$,
     $R^4$ = methylanilino I-17 $R^3 = R^5 = R^6 = R^7 = R^8 = H$, $R^1 = NH_2$, $R^2 = Br$,
     $R^4$ = methylanilino

I-18 $R^2 = R^3 = R^6 = R^7 = H$, $R^1 = R^4 = NOC_2H_4NH$,
     $R^5 = R^8 = OH$

Pro. Ex. No. = Product Example Number

Formula [II-a]:

Formula [II-b]:

The perinone dyes which are mixed with the above-mentioned anthraquinone dyes for use as a black colorant in the compositions of the invention are known products of formula [III].

Formula [III]:

The perinone dyes which are mixed with the anthraquinone to produce a black dye may be used alone or in combination thereof.

Preferred perinone dyes used in the composition of the invention are those of formula [IV], which have practical heat resistance in molding and good transmittance in main laser beam wavelength (800 nm to 1200 nm).

formula [IV]:

wherein P and Q, which may be the same or different, are independently constituent units which can be represented by the following formula [IV-a] to [IV-c]. $R^{14}$ to $R^{29}$, which may be the same or different, are independently an atom or a group selected from the group consisting of H, halogen atom such as Cl, Br, alkyl group having 1 to 18 carbon atoms, alkoxy group having 1 to 18 carbon atoms, aralkyl group, aryl group; $m^6$ is the number of 1 or 2.

formula [IV-a]:

formula [IV-b]:

formula [IV-c]:

Dyes which belong to the class of perinone dyes listed in COLOR INDEX are for example, C.I. Solvent Orange 60, 78, C.I. Solvent Red 135, 162, 178, 179, C.I. Violet 29, C.I. Pigment Orange 43, C.I. Pigment Red 149. If solubility and dispersibility in the resin are enhanced, solvent type dyes are preferred.

Examples of the perinone dyes of formula [IV] are illustrated below in Table 3.

TABLE 3

| Pro. Ex. No. | P | Q |
|---|---|---|
| IV-1 | Formula [IV-b], $R^{18} = R^{19} = R^{20} = R^{21} = R^{22} = R^{23} = H$ | Formula [IV-a], $R^{14} = R^{15} = R^{16} = R^{17} = H$ |
| IV-2 | Formula [IV-b], $R^{18} = R^{19} = R^{20} = R^{21} = R^{22} = R^{23} = H$ | Formula [IV-a], $R^{14} = R^{15} = R^{16} = R^{17} = Cl$ |
| IV-3 | Formula [IV-b], $R^{18} = R^{19} = R^{20} = R^{21} = R^{22} = R^{23} = H$ | Formula [IV-c], $R^{24} = R^{25} = R^{26} = R^{27} = R^{28} = R^{29} = H$ |
| IV-4 | Formula [IV-a], $R^{14} = R^{15} = R^{16} = R^{17} = H$ | Formula [IV-b], $R^{18} = R^{19} = R^{20} = R^{21} = R^{22} = R^{23} = H$ |
| IV-5 | Formula [IV-b], $R^{18} = R^{19} = R^{20} = R^{21} = R^{22} = R^{23} = H$ | Formula [IV-c], $R^{24} = R^{26} = R^{27} = R^{28} = R^{29} = H, R^{25} = OC_2H_5$ |
| IV-6 | Formula [IV-b], $R^{18} = R^{19} = R^{20} = R^{21} = R^{22} = R^{23} = H$ | Formula [IV-a], $R^{14} = R^{15} = R^{17} = H, R^{16} = benzoyl$ |
| IV-7 | 2Formula [IV-b], $R^{18} = R^{19} = R^{20} = R^{22} = R^{23} = H$, $R^{21} = C_4H_9$ | Formula [IV-a], $R^{14} = R^{17} = H$ |
| IV-8 | Formula [IV-b], $R^{18} = R^{19} = R^{20} = R^{21} = R^{22} = R^{23} = H$ | Formula [IV-c], $R^{24} = R^{26} = R^{27} = R^{28} = R^{29} = R^{25} = phenyl$ |
| IV-9 | Formula [IV-b], $R^{18} = R^{19} = R^{20} = R^{21} = R^{22} = R^{23} = H$ | Formula [IV-a], $R^{15} = R^{16} = R^{17} = H, R^{14} = Br$ |
| IV-10 | Formula [IV-b], $R^{18} = R^{19} = R^{20} = R^{21} = R^{22} = R^{23} = H$ | Formula [IV-a], $R^{15} = R^{16} = R^{17} = H, R^{14} = COOH$ |

Pro. Ex. No. = Product Example Number

Dyes which belong to monoazo complex dyes that are mixed with the anthraquinone dyes to produce a black dye for use as colorants in the composition of the invention, can be represented by formula [V].

Formula [V] is:

wherein $R^{30}$ and $R^{31}$, which may be the same of different, are Cl, $SO_2R^{32}$, $SO_2(-R^{33})(-R^{34})$, or H; wherein $R^{33}$ and $R^{34}$, which may be the same or different, are independently hydrogen atom, linear or branched C1-C4 alkyl; $R^{32}$ is linear or branched C1-C4 alkyl; $L_3$ and $L_4$ are independently O or COO; $(D)^+$ is hydrogen ion, cation of alkali metals, ammonium ion, cations of organic amine including aliphatic primary, secondary and tertiary amines, quaternary ammonium ion; $K^2$ is an integer, $m^2$ is 0, 1 or 2; $M^2$ is selected from metals of ionic valency from 2 to 4 (such as Zn, Sr, Cr, Al, Ti, Fe, Zr, Ni, Mn, B[boron] and Co), preferably metal of trivalent metal such as Cu or trivalent metal such as Cr, Co, Ni, and Al.

$B^1$ and $B^2$ are represented by formula [V-a] or formula [V-b].

formula [V-a]:

or

-continued formula [V-b]:

wherein $R^{35}$ and $R^{37}$, which may be the same of different, are Cl, $SO_2R^{32}$, $SO_2(-R^{33})(-R^{34})$, or H; $R^{33}$ and $R^{34}$, which may be the same or different, are independently hydrogen atom, linear or branched C1-C4 alkyl; and $R^{36}$ and $R^{38}$, which may be the same or different, are independently hydrogen atom, linear or branched C1-C18 alkyl, carboxyl, hydroxyl, C1-C18 alkoxy, amino or halogen atoms.

Suitable cations for use in the above-mentioned monoazo complex dyes are $H^+$; cations of alkali metal, ammonium ion, cations of organic amine including aliphatic primary, secondary and tertiary amines, and quaternary ammonium ion.

Suitable amines for use in producing the above-mentioned monoazo complex dyes and common in dyestuffs include aliphatic amines, alicyclic amines, alkoxyalkyl amines, amines having alkanol, diamine, amines of guanidine derivatives, and aromatic amines.

Examples of the monoazo complex dyes of formula [V] wherein $B^1$ and $B^2$ are of the formula [V-a] are indicated as below formula [V-c]. See also Table 4 illustrating a number of selections of Formula [V-c].

TABLE 4

Formula [V-c]

| Pro. Ex. No. | $R^{30}$ | $R^{31}$ | $R^{35}$ | $R^{36}$ | $M^2$ | $L_3$ | $L_4$ | $m^2$ | $K^2(D)^+$ |
|---|---|---|---|---|---|---|---|---|---|
| V-1 | H | H | H | H | Cr | COO | COO | 1 | $H^+$ |
| V-2 | Cl | Cl | $SO_2NH_2$ | H | Cr | O | O | 1 | $H^+$ |
| V-3 | $SO_2NH_2$ | $SO_2NH_2$ | $SO_2NH_2$ | H | Cr | O | O | 1 | $H^+$ |
| V-4 | Cl | Cl | $SO_2NH_2$ | H | Co | O | O | 1 | $H^+$ |
| V-5 | $SO_2NH_2$ | $SO_2NH_2$ | H | H | Ni | O | O | 1 | $H^+$ |
| V-6 | H | H | $SO_2NH_2$ | H | Cu | COO | COO | 1 | $H^+$ |
| V-7 | H | H | H | H | Cr | COO | COO | 1 | $C_4H_9CH(C_2H_5)OC_3H_6N^+H_3$ |
| V-8 | Cl | Cl | $SO_2NH_2$ | H | Cu | O | O | 1 | $C_{12}H_{25}N^+H_2(CH_2CH_2O)_2H$ |
| V-9 | Cl | Cl | $SO_2NH_2$ | H | Cr | O | O | 1 | $Na^+$ |
| V-10 | Cl | $SO_2NH_2$ | H | Cl | Co | O | O | 1 | $H^+$ |

Pro. Ex. No. = Product Example Number

Examples of the monoazo complex dyes of formula [V], wherein $B^1$ and $B^2$ are of the formula [V-b] are below formula [V-d]. See also Table 5 illustrating a number of selections of Formula [V-d].

TABLE 5

Formula [V-d]

[Structure: complex dye with substituents $R^{35}$, $R^{36}$, $R^{31}$, $R^{30}$, HNOC, $H_3C$, $L_3$, $L_4$, $M^2$, O, CH$_3$, CONH, N=N groups] $M^2-$ $K^2(D)^+$

| Pro. Ex. No. | $R^{30}$ | $R^{31}$ | $R^{35}$ | $R^{36}$ | $M^2$ | $L_3$ | $L_4$ | $m^2$ | $K^2(D)^+$ |
|---|---|---|---|---|---|---|---|---|---|
| V-11 | $SO_2NH_2$ | $SO_2NH_2$ | H | H | Co | O | O | 1 | $H^+$ |
| V-12 | H | H | $SO_2NH_2$ | H | Cr | COO | COO | 1 | $H^+$ |
| V-13 | Cl | Cl | H | H | Co | O | O | 1 | $C_4H_9CH(C_2H_5)OC_3H_6N^+H_3$ |
| V-14 | $SO_2NH_2$ | $SO_2NH_2$ | $SO_2NH_2$ | H | Cr | O | O | 1 | $NH_4^+$ |
| V-15 | Cl | Cl | $SO_2NH_2$ | H | Co | COO | COO | 1 | $H^+$ |
| V-16 | H | H | $SO_2NH_2$ | H | Co | COO | COO | 1 | $H^+$ |

Pro. Ex. No. = Product Example Number

If desired, the anthraquinone dyes which absorb less than 500 nm, but which impart colors of yellow, orange and red may be mixed with the mixture of neutral anthraquinone dyes with the red dyes to produce black colorants. For example, one or more anthraquinone dyes described in the COLOR INDEX below can be combined with the mixture to produce a black colorant:

Red Dyes:
C.I. Solvent Red 52, 57, 111, 114, 136, 137, 138, 139, 143, 144, 145, 146, 147, 148, 149, 150, 151, 152, 155, 156, 168, 169, 170, 171, 172, 177, 181, 190, 191, 194, 199, 200, 201.

Orange Dyes:
C.I. Solvent Orange 35, 55, 64, 65, 66, 68, 69, 71, 77, 86, 87, 163.

Yellow Dyes:
C.I. Solvent Yellow 100, 109, 117, 125, 156, 158, 163 or C.I. Vat Yellow 1, 2, 3.

The thermoplastic resins for use in the invented compositions include polyamides such as polyamide 6(Nylon 6) and polyamide 6/6(Nylon 6/6), polyester and the like as is commonly used in making a molded product.

Preferred thermoplastic resins useful in the practice of this invention include polyamides, copolymers of amides and/or other monomers, blends of different polyamides, blends of polyamides with other thermoplastic polymers and/or blends of the aforementioned copolymers with a polyamide and/or blends of different copolymers with or without thermoplastic polymers.

An example of a suitable polyamide is polyamide 6 or 6/6. The addition of the mixture of the neutral anthraquinone dyes with other red dyes in such polyamide resin compositions imparts substantially and surprisingly increased laser weldability without decrease of other important properties such as heat-resistance, chemical-resistance, moldability and mechanical characteristics such as rigidity and toughness of articles molded therefrom. Polyamide 6 is especially advantageous because its low rate of crystallization results in an increased transmission coefficient for laser beams with particular wavelengths and without adversely affecting required toughness and warpage. Such compositions are advantageous in applications such as automobile parts due to their balanced range of heat-resistance and mechanical properties.

The thermoplastic resins for use in the inventive compositions include polyamides, polyesters, and the like as are commonly used in making a molded product. As the examples of the polyamide resins utilized in the present invention, condensation products of dicarboxylic acids and diamines, condensation products of aminocarboxylic acids and ring-opening polymerization products of cyclic lactams can be cited. As examples of dicarboxylic acids, adipic acid, azelaic acid, sebacic acid, dodecanedioic acid, isophthalic acid and terephthalic acid can be cited. As examples of diamines, tetramethylene diamine, hexamethylene diamine, octamethylene diamine, nonamethylene diamine, dodecamethylene diamine, 2-methylpentamethylene diamine, 2-methyloctamethylene diamine, trimethylhexamethylene diamine, bis(p-aminocyclohexyl)methane, m-xylene diamine and p-xylene diamine may be cited. As the example of aminocarboxylic acid, 11-aminododecanoic acid can be cited. As the examples of cyclic lactam, caprolactam and laurolactam can be cited. As the specific examples of condensation products and ring-opening polymerization products, aliphatic polyamides such as nylon 6, nylon 66, nylon 46, nylon 610, nylon 612, nylon 11, nylon 12, semi-aromatic polyamides such as polymetaxylene adipamide (nylon MXD6), polyhexamethylene terephthalamide (nylon 6T), polyhexamethylene isophthalamide (nylon 6I) and polynonamethylene terephthalamide (nylon 9T), and copolymers and mixtures of these polymers can be cited. As the examples of the copolymers, nylon 6/66, nylon 66/6I, nylon 6I/6T and nylon 66/6T can be cited.

A wide range of common polyester molding compositions useful for blending with colorants in the practice of the present invention are known in the art. These include polymers which are, in general, condensation products of dicarboxylic acids and diols. Dicarboxylic acids can be selected from the group consisting of adipic acid, azelaic acid, sebacic acid, dodecanedioic acid, terephthalic acid, isophthalic acid, naphthalenedicarboxylic acid and diphenyl dicarboxylic acid, and diols can be selected from the group consisting of ethylene glycol, propylene glycol, butanediol, hexanediol, neopentyl glycol, cyclohexanediol, and bisphenol A. Preferred polyesters include polyethylene terephtalate (PET), polypropylene terephthalate (3GT), polybutylene terephthalate (PBT), polyethylene 2,6-naphthalate (PEN), polycyclohexane dimethylene terephthalate (PCT) and copolymers and mixtures thereof. As the examples of the copolymers, some of dicarboxylic acids or some of diols can be added to the condensation products. Polyester polymers may be copolymerized a little amount of compnents like trimesic acid, trimellitic acid, pyromellitic acid, glycerol, and pentaerythritol which have more than 3 functional groups.

Additional other polymers such as polycarbonate can also be presented, provided that the essential characteristics of the composition of the present invention are not substantially altered.

A black colorant of the composition of the invention comprises a mixture of neutral anthraquinone dyes which impart colors of blue, violet or green, absorb visible light with wavelength at less than 700 nm in the visible light region and transmit a laser beam with wavelength at 800 nm to 1200 nm in the infra-red region, combined with at least other red dyes which transmit the laser beam with wavelength at 800 nm to 1200 nm in infra-red region, such as perinone dyes, monoazo complex dyes or disazo dyes, at predetermined weight ratios.

The amount of incorporation of the laser-transmitting colorants in the resin compositions is 0.01-15 weight %, and preferably 0.05-5 weight %, versus 100 weight % thermoplastic resin.

The dye mixture containing the neutral anthraquinone dye is present in amount of from 0.01 to 1% by weight, when the composition comprises polyamide 6 as at least the major component of the polyamide resin composition. The amount of the above-mentioned dye mixture may be determined by applications requiring different properties associated with the laser welding.

The composition of the present invention may contain an inorganic filler or reinforcing agent. Suitable examples include fibrous reinforcement such as glass fiber and carbon fiber, glass flakes, glass beads, talc, kaolin, wollastonite silica, calcium carbonate, potassium titanate and mica. Glass fiber is a preferred selection. Glass fibers suitable for use in the present invention are those generally used as reinforcing agents for thermoplastic resins and thermosetting resins.

The preferred amount of glass fiber in the resin composition of the present invention is from about 5 to about 120 parts by weight, with respect to 100 parts by weight of the thermoplastic resin. If it is under 5 weight percent, it would be difficult to give sufficient reinforcement from the glass fiber, and if it is over 120 weight percent, it would have poor processability and poor transparency to laser. It is preferable to use from about 5 to about 100 weight percent, and particularly about 15 to about 85 weight percent.

One or more optional compounds selected from a wide variety of materials tailored for different applications of the resin compositions can be contained in the composition according to the present invention. Typically, additive compounds can include flame retardants, impact modifiers, viscosity modifiers, heat resistance improvers, lubricants, antioxidants and UV-and other stabilizers. The compositions of the present invention may have such additive compounds in such amounts that they do not harm their characteristic properties. These and other additives are used in accordance with accepted practices as understood by those having skill in the art.

In the present invention, thermoplastic resin compositions are provided that are suitable for laser welding, including transparent articles for laser beam transmission to achieve welding together with opaque articles for laser beam absorption. Suitable opaque articles and their compositions are described for example in DE-A-4432081.

Figure 1:
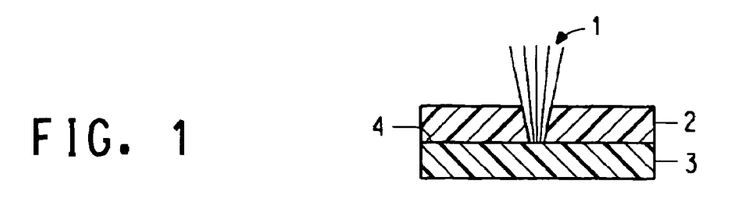
FIG. 1 is a view of the articles in contact and with a laser beam applied thereto.
Figure 2:
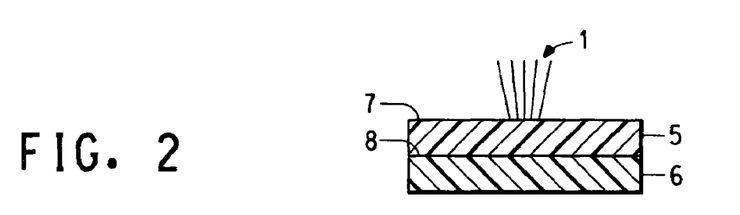
FIG. 2 is identical to FIG. 1, but with articles of the same color.

FIG. 1 is an illustration of a conventional laser welding arrangement. A laser beam 1 is transmitted through the first article 2 to the second article 3 containing laser beam absorbing combination, and the surface 4 of the second article 3 that have absorbed the laser energy 1 is melted and pressed with the surface of the first article 2 to weld them together. As show in FIG. 2, two thermoplastic components 5 and 6 must have different transmission and absorption coefficients and it is difficult to weld at surface 8 two articles having the same color. In FIG. 2 the laser 1 is applied to the surface 7 of component 5.

Figure 3:
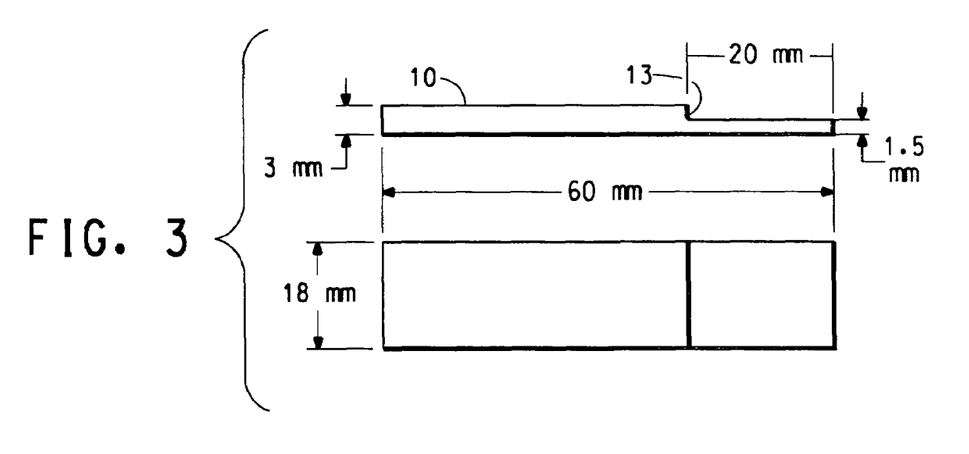
FIG. 3 is illustrates a shape and dimensions of the test piece for the laser welding test.
Figure 4:
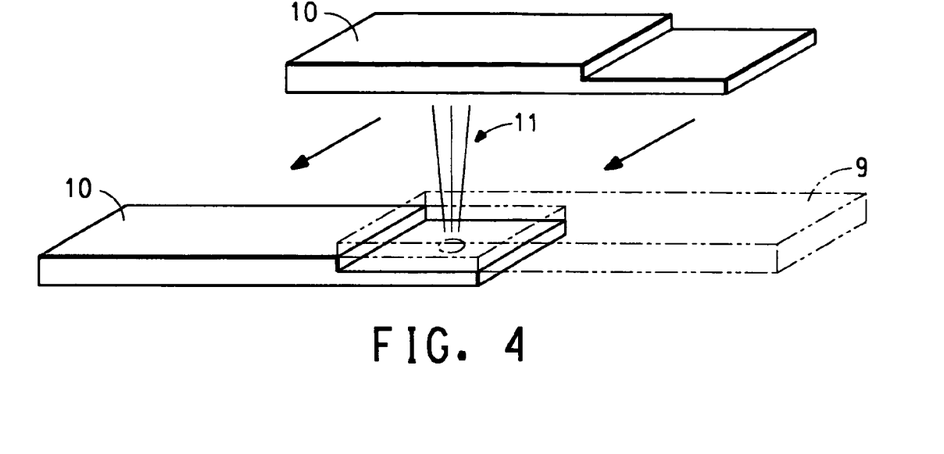
FIG. 4 is a perspective view of test pieces disposed close to each other for a laser welding test and relationship the test piece and laser beam.
Figure 5:
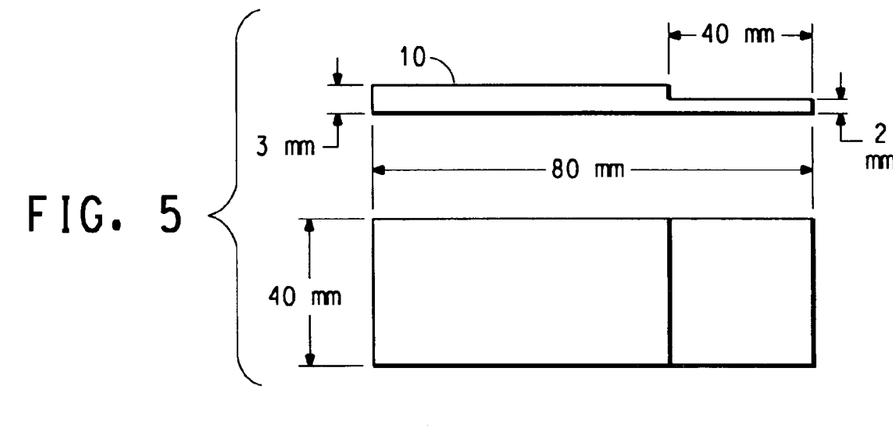
FIG. 5 is illustrates a shape and dimensions of the test piece for the laser welding test.
Figure 6:
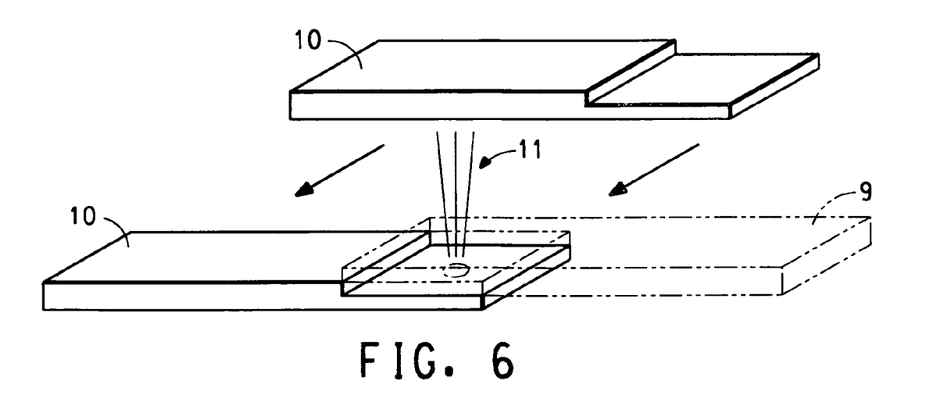
FIG. 6 is a perspective view of test pieces disposed close to each other for a laser welding test and relationship the test piece and laser beam.

In FIGS. 3 and 5 herein, there is shown a lower test piece 10 used in the laser welding test of these examples. The noted dimensions create a notch in the test piece 10. The upper test piece 9 is of the same construction and dimensions. In FIGS. 4 and 6, there is shown the joinder of upper test piece 9 to lower test piece 10, and the movement of the laser 11 (in the direction of the arrow) to form the weld.

EXAMPLES

The present invention is illustrated by the following examples and comparative examples.

Example A

In this Example, Example B, and Comparative Examples C and D, 400 grams of (unreinforced) Nylon 6 ZYTEL pellets (available from E.I. DuPont de Nemours and Co. under the product name Zytel®7301) were dried under vacuum at 120° C., for more than 8 hours, then mixed with the designated dye mixture in a stainless tumble mixer with stirring for one hour. The mixture was then injection molded to form the injection molded test specimens (whose sizes are 48 mm×86 mm×3 mm) using K50-C produced by Kawaguchi Steel K.K. and the cylinder temperature was set to 250° C. Mold temperature was 60° C. Important results are shown in Table 6.

In this Example the dye mixture is anthraquinone blue dye of C.I. Solvent Blue 97 (0.40g) combined with perinone red dye represented by C.I. Solvent Red 179 (0.24g) and anthraquinone yellow dye represented by C.I. Solvent Yellow 163 (0.16g). Good and uniformly black appearance and surface gloss without color shading of the specimens were observed.

Example B

In this Example the dye mixture was anthraquinone blue dye of C.I. Solvent Blue 101 (0.53 g) combined with perinone red dye represented by C.I. Solvent Red 179 (0.18 g) and anthraquinone yellow dye represented by C.I. Solvent Yellow 163 (0.09 g). Good and uniformly black appearance and surface gloss without color shading of the specimens were observed.

Comparative Example C

In this Comparative Example the dye mixture was anthraquinone violet dye of C.I. Solvent Violet 13 (0.68 g) combined with quinopthalone yellow dye represented by C.I. Solvent Yellow 114 (0.12 g). Good and uniformly black appearance and surface gloss without color shading of the specimens were observed.

Comparative Example D

In this Comparative Example the dye mixture was a copper phthalocyanine blue pigment of C.I. Pigment Blue 15.3 (0.48 g) combined with perinone red dye represented by C.I. Solvent Red 179 (0.24 g) and anthraquinone yellow dye represented by C.I. Solvent Yellow 163 (0.08 g). Good and uniformly black appearance and surface gloss without color shading of the specimens were observed.

TABLE 6

| | | Example A | Example B | Comparative Example C | Comarative. Example D |
|---|---|---|---|---|---|
| Transmission | TA | 0.94 | 0.94 | 0.90 | 0.93 |
| | TB | 1.04 | 1.02 | 0.85 | 0.41 |
| OD | | 2.51 | 2.49 | 2.45 | 2.02 |
| Light Resistance ΔE | | 1.08 | 1.05 | 1.48 | 1.06 |
| Sublimation Test ΔE | | 8.20 | 8.19 | 19.23 | 5.81 |

This testing demonstrates that Examples A and B showed as high transmittance as a natural resin at a main wavelength in infra-red region (800 nm to 1200 nm), compared with Comparative Example D. And Examples A and B showed low sublimation property, compared with Comparative Example C. It means that even if thermoplastic resin colored with Examples A and B is set under higher temperature as like automobile or electric industry, their colorant have property not to migrate to other parts.

Example E

In this Example, Example F, and Comparative Examples G and H, 400 grams of reinforced polyester pellets (prepared from terephthalic acid and ethylene glycol the intrinsic viscosity of which is 0.85 when measured at 25° C. as a 1% solution in a mixed solution of phenol and dichlorobenzene with the weight ratio of 1/1 and containing 30 wt % chopped strand glass fibers 187H produced by Nippon Electric Glass Co., Ltd. based on a total weight of the polyester resin composition) were dried under vacuum at 120° C., for more than 8 hours, then mixed with the designated dye mixture in a stainless tumble mixer with stirring for one hour. The mixture was then injection molded to form the injection molded test specimens (whose sizes are 48 mm×86 mm×3 mm) using K50-C produced by Kawaguchi Steel K.K. and the cylinder temperature was set to 290° C. Mold temperature was 60° C.

In this Example the dye mixture is anthraquinone blue dye of C.I. Solvent Blue 97 (0.40 g) with perinone red dye represented by C.I. Solvent Red 179 (0.24 g) and anthraquinone yellow dye represented by C.I. Solvent Yellow 163 (0.16 g). Good and uniformly black appearance and surface gloss without color shading of the specimens were observed.

Example F

In this Example the dye mixture is anthraquinone blue dye of C.I. Solvent Blue 101 (0.53 g) with perinone red dye represented by C.I. Solvent Red 179 (0.18 g) and anthraquinone yellow dye represented by C.I. Solvent Yellow 163 (0.09 g) Good and uniformly black appearance and surface gloss without color shading of the specimens were observed.

Comparative Example G

In this Example the dye mixture is anthraquinone violet dye of C.I. Solvent Violet 13 (0.68 g) with quinopthalone yellow dye represented by C.I. Solvent Yellow 114 (0.12 g) Good and uniformly black appearance and surface gloss without color shading of the specimens were observed.

Comparative Example H

In this Example the dye mixture is phthalocyanine pigment of C.I. Pigment blue 15.3 (0.48 g) with perinone red dye represented by C.I. Solvent Red 179 (0.24 g) and anthraquinone yellow dye represented by C.I. Solvent Yellow 163 (0.08 g) Good and uniformly black appearance and surface gloss without color shading of the specimens were observed.

The results are set forth in the following Table 7.

TABLE 7

| | | Example E | Example F | Comparative Example G | Comarative Example H |
|---|---|---|---|---|---|
| Transmission | TA | 0.93 | 0.91 | 0.92 | 0.93 |
| | TB | 0.96 | 0.94 | 0.89 | 0.34 |
| OD | | 1.79 | 1.85 | 1.86 | 1.77 |
| Sublimation Test ΔE | | 7.44 | 8.16 | 19.33 | 3.86 |

This testing demonstrates that Examples E and F showed as high transmittance as a natural color resin at a main wavelength in infra-red region (800 nm to 1200 nm), compared with Comparative Example H. And Examples E and F showed low sublimation property, compared with Comparative Example G. This testing obtained the same results as Nylon 6.

Test Procedures (1) Transmission Properties

Transmittance (T) in the range of 400 nm to 1200 nm of the test plates with laser beams having respective wavelengths of 940 nm (Semiconductor laser) and 1064 nm (YAG laser) was measured using a U-3410 spectrometer produced by Hitachi with 60φ sphere photometer for wavelength from ultraviolet to near-infrared. The ratio (TA) of transmission with 940 nm: transmission with 1064 nm and the ratio (TB) of transmission with 940 nm: tarnsmission of natural resin are determined and compared between the examples.

(2) Appearance and Surface Gloss

Appearance of the test plates were evaluated by measuring Reflection Density (OD) of the test plates by Refelection Density meter TR-927 produced by Macbeth. Test plates having higher OD values are judged to have better surface smoothness and rich in gloss.

(3) Light Resistance

Each test plate was exposed to Xenon Weather Meter (produced by Toyo Seiki K.K., trade name: AtlasCI-4000) for 150 hours according to the following conditions. The amount of color fading and discoloration ΔE between "before" and "after" light irradiation was determined and mesaured using a colorimeter (produced by Juki, trade name: JP 7000).

| Conditions of Light Resistance Test Procedure | |
| --- | --- |
| Radial illumination (W/m$^2$)(E) | 60 |
| Black standard temperature(° C.) | 83 |
| Rain test | N |
| Chamber temeparture(° C.) | 55 |
| Moisture(%) | 50 |

The test plate having greater ΔE are judged to have greater discoloring and fading.

(4) Sublimation Test

The amount of dye sublimation was determined by ΔE between "before" and "after" white tape attached on each test plate being placed and kept in an oven at 140° C. for 3 hours and was mesaured using the aforementioned colorimeter.

The white tape attached on the test plate having greater ΔE are judged to have greater sublimation.

Example I 5 kg of Nylon 6 Zytel® 7301 pellets (available from E.I. DuPont de Nemours and Co.) were dried in a dehumidified dryer set at 80° C. for more than 4 hours and mixed with a mixture of anthraquinone green dye of C.I. Solvent Green 3 (6.6 g) with perinone red dye represented by C.I. Solvent Red 179 (2.3 g) and anthraquinone yellow dye represented by C.I. Solvent Yellow 163 (1.1 g)

The dye-mixed pellets above were then molded into the test pieces of 60 mm×18 mm×1.5 mm on Sumitomo 75T molding machine, with cylinder temperature set at 260° C. and mold temperature at 800.

Example J 14 kg of Nylon 6 Zytel® 7301 pellets (available from E.I. DuPont de Nemours and Co.), 8.8 grams of CuI, 100 grams of aluminum distearate, and 6 kg of fiberglass (TP57, available from Nippon Sheet Glass Co., Ltd.) were mixed and extruded on a twin-screw extruder (ZSK-40 of Werner & Pfleiderer Corporation).

5 kg of the obtained pellets were dried in a dehumidified dryer set at 80° C. for more than 4 hours and mixed with a mixture of anthraquinone green dye of C.I. Solvent Green 3 (6.6 g) with perinone red dye represented by C.I. Solvent Red 179 (2.3 g) and anthraquinone yellow dye represented by C.I. Solvent Yellow 163 (1.1 g)

The dye-mixed pellets above were then molded into the test pieces according to the ISO3167 on a Toshiba IS 170FIII molding machine, with cylinder temperature set at 260° C. and mold temperature at 80° C., and the test pieces of 60 mm×18 mm×1.5 mm on Sumitomo 75T molding machine, with cylinder temperature set at 260° C. and mold temperature at 80° C.

Comparative Example K 5 kg of Nylon 6 Zytel® 7301 pellets (available from E.I. DuPont de Nemours and Co.) were dried in a dehumidified dryer set at 80° C. for more than 4 hours and mixed with 28 grams of nigrosine dye (Nigrosine Base SAP, Orient Chemical Industries Ltd.).

The dye-mixed pellets above were then molded into the test pieces of 60 mm×18 mm×1.5 mm on Sumitomo 75T molding machine, with cylinder temperature set at 260° C. and mold temperature at 80° C.

Comparative Example L 5 kg of Nylon 6 Zytel® 7301 pellets (available from E.I. DuPont de Nemours and Co.) were dried in a dehumidified dryer set at 80° C. for more than 4 hours and mixed with 5 grams of carbon black and 28 grams of nigrosine dye (Nigrosine Base SAP, Orient Chemical Industries Ltd.).

The dye-mixed pellets above were then molded into the test pieces of 60 mm×18 mm×1.5 mm on Sumitomo 75T molding machine, with cylinder temperature set at 260° C. and mold temperature at 80° C.

Comparative Example M 14 kg of Nylon 6 Zytel® 7301 pellets (available from E.I. DuPont de Nemours and Co.), 8.8 grams of CuI, 100 grams of aluminum distearate, and 6 kg of fiberglass (TP57, available from Nippon Sheet Glass Co., Ltd.) were mixed and extruded on the ZSK-40 twin-screw extruder.

5 kg of the obtained pellets were dried in a dehumidified dryer set at 80° C. for more than 4 hours and mixed with 28 grams of nigrosine dye (Nigrosine Base SAP, Orient Chemical Industries Ltd.).

The dye-mixed pellets above were then molded into the test pieces according to the ISO3167 on the Toshiba IS 170FIII molding machine, with cylinder temperature set at 260° C. and mold temperature at 80° C., and the test pieces of 60 mm×18 mm×1.5 mm on the Sumitomo 75T molding machine, with cylinder temperature set at 260° C. and mold temperature at 80° C.

Comparative Example N 14 kg of Nylon 6 Zytel® 7301 pellets (available from E.I. DuPont de Nemours and Co.), 8.8 grams of CuI, 100 grams of aluminum distearate, and 6 kg of fiberglass (TP57, available from Nippon Sheet Glass Co., Ltd.) were mixed and extruded on the ZSK-40 twin-screw extruder.

5 kg of the obtained pellets were dried in a dehumidified dryer set at 80° C. for more than 4 hours and mixed with 5grams of carbon black and 28 grams of nigrosine dye (Nigrosine Base SAP, Orient Chemical Industries Ltd.).

The dye-mixed pellets above were then molded into the test pieces according to the ISO3167 on the Toshiba IS 170FIII molding machine, with cylinder temperature set at 260° C. and mold temperature at 80° C., and the test pieces of 60 mm×18 mm×1.5 mm on the Sumitomo 75T molding machine, with cylinder temperature set at 260° C. and mold temperature at 80° C.

(5) Laser Welding Test

The 60 mm×18 mm×1.5 mm test pieces were placed so that 20 mm of each were overlapped. The overlapped area was irradiated with a Nd: YAG laser (Olion 510, 1064 nm continuous) set at 4 W with 3 mm diameter for 2 seconds. Welded test pieces were visually inspected and judged OK when adhesion was formed and NG when the two test pieces were not adhered and fell apart or when the surface of transparent part were burnt and damaged, per Table 8 below.

TABLE 8

|  | Upper test piece | |
| --- | --- | --- |
|  | Example I | Comparative Example K |
|  | Lower test piece | |
|  | Comparative Example L | Comparative Example L |
| Welding results | Good adhesion OK | Could not adhere NG |

The 60 mm×18 mm×1.5 mm test pieces were placed so that 20 mm of each be overlapped. The overlapped area was irradiated with a diode laser (SDL-FD25, 820 nm continuous) set at 4W with 3 mm diameter for 10 seconds. The welded test pieces were tested for strength on the Autograph (Shimadzu Seisakusho) with 2 mm/min speed. The results are shown in Table 9.

TABLE 9

|  | Upper test piece | | |
| --- | --- | --- | --- |
|  | Example I | Example J | Comparative Example M |
|  | Lower test piece | | |
|  | Comparative Example L | Comparative Example N | Comparative Example N |
| Weld Strength (kgf) | 33 | 34 | Could not adhere NG |

(6) Tensile Properties and Heat Aging

Tensile strength and elongation were measured according to ISO527 after 5 molding and after heat aging at 170° C. for 1000 hours. Test piece appearance was also observed. The results are shown in Table 10.

TABLE 10

|  |  | Example J | Comparative Example M | Comparative Example N |
| --- | --- | --- | --- | --- |
| After Molding | Tensile Strength (Mpa) | 190 | 171 | 190 |
|  | Elongation (%) | 3.7 | 3.4 | 3.8 |

TABLE 10-continued

|  |  | Example J | Comparative Example M | Comparative Example N |
| --- | --- | --- | --- | --- |
| After Aging | Tensile Strength (Mpa) | 156 | 152 | 169 |
|  | Elongation (%) | 2.0 | 2.2 | 2.4 |
|  | Appearance | Black | Dark brown | Black |

Examples I and J exhibited good adhesion in laser welding with an opaque workpiece part for laser beam, being made of thermoplastic resin containing carbon black. The mechanical properties after molding and aging showed no deterioration even when a colorant was added.

Example O and P and Comparative Example Q

Fiberglass reinforced nylon 6 (Zytel®973G30L, available from E.I. DuPont de Nemours and Co.) and dyes were dry-blended with the amount described in Table 11. The blended material was molded into two types of test pieces: one for mechanical properties, and the other for laser welding. Test pieces for mechanical properties were molded according to the ISO3167 on the Toshiba IS 170FIII injection molding machine, with cylinder temperature set at 260° C. and mold temperature at 80° C. Test pieces for laser welding, with dimensions illustrated as FIG. 3, were molded on the Sumitomo Juki 75T injection molding machine, with cylinder temperature set at 250° C. and mold temperature set at 80° C.

Tensile strength and elongation were measured according to ISO527 and notched Charpy impact strength was measured according to ISO179.

Laser welding was conducted using two of the test pieces described above, combined as illustrated in FIG. 4. The Example O and P were used as Upper test piece and the Comparative Example Q was used as Lower test piece. A diode laser (wavelength 940 nm, manufactured by Rofin-Sinar Laser GmbH) was irradiated with laser power at 50W and various speeds, with 3 mm diameter. Tensile strength of the welded test pieces were measured on the Autograph (manufactured by Shimazu Seisakusho) by pulling apart at 5 mm/minute and its maximum load was recorded.

TABLE 11

|  |  | Example O | Example P | Comp. Ex. Q |
| --- | --- | --- | --- | --- |
| 73G30L | kg | 4.9925 | 4.9925 | 4.99 |
| C.I. Solvent Blue 87 |  | 3.75 g |  |  |
| C.I. Solvent Red 179 |  | 2.25 g |  |  |
| C.I. Solvent Yellow 163 |  | 1.50 g |  |  |
| C.I. Solvent Green 3 |  |  | 4.50 g |  |
| C.I. Solvent Red 18 |  |  | 3.00 g |  |
| Carbon black |  |  |  | 10 g |
| Tensile strength | MPa | 174 | 181 | 185 |
| Elongation | % | 3.9 | 4.2 | 3.4 |
| Notched Charpy | KJ/m$^2$ | 12.8 | 13.3 | 12.2 |
| Laser Welding at 50 W |  |  |  |  |
| 2.5 m/min | Kgf | 195 | 189 | — |
| 5 m/min | Kgf | 196 | 177 | — |
| 10 m/min | Kgf | 115 | 110 | — |

Example R and S and Comparative Example T

Fiberglass reinforced nylon 66 (Zytel®70G33HS1L, available from E.I. DuPont de Nemours and Co.) and dyes were dry-blended with the amount described in the Table 12. The blended material was molded into two types of test pieces: one for mechanical properties, and another for laser welding. Test pieces for mechanical properties were molded according to the ISO3167 on the Toshiba IS 170FIII injection molding machine, with cylinder temperature set at 280° C. and mold temperature at 80° C. Test pieces for laser welding, with dimensions illustrated in FIG. 3, were molded on the Sumitomo Juki 75T injection molding machine, with cylinder temperature set at 270° C. and mold temperature set at 80° C.

Tensile strength and elongation were measured according to ISO527 and notched Charpy impact strength was measured according to ISO179.

Laser welding was conducted using two pieces of the test pieces described above, combined as illustrated in FIG. 4. The Example R and S were used as Upper test piece and the Comparative Example T was used as Lower test piece. Diode laser (wavelength 940 nm, manufactured by Rofin-Sinar Laser GmbH) was irradiated with the power at 80 W and at various speeds with 3 mm diameter. Tensile strength of the welded test pieces was measured on Autograph (manufactured by Shimazu Seisakusho) by pulling apart at 5 mm/minute and its maximum load was recorded.

TABLE 12

|  |  | Example R | Example S | Comp. Ex. T |
|---|---|---|---|---|
| 70G33HSIL | kg | 4.9925 | 4.9925 | 4.99 |
| C.I. Solvent Blue 97 |  | 3.75 g |  |  |
| C.I. Solvent Red 179 |  | 2.25 g |  |  |
| C.I. Solvent Yellow 163 |  | 1.50 g |  |  |
| C.I. Solvent Green 3 |  |  | 4.50 g |  |
| C.I. Solvent Red 18 |  |  | 3.00 g |  |
| Carbon black |  |  |  | 10 g |
| Tensile strength | MPa | 199 | 207 | 207 |
| Elongation | % | 3.4 | 3.8 | 3.2 |
| Notched Charpy | kJ/m² | 12.3 | 13.5 | 11.9 |
| Laser Welding at 80 W |  |  |  |  |
| 2.5 m/min | kgf | 97 | 75 | — |
| 5 m/min | kgf | 195 | 185 | — |
| 10 m/min | kgf | 194 | 187 | — |

Example U and V and Comparative Example W

Fiberglass reinforced polyester pellet of Example E (dried as described in Example E) and dyes were dry-blended with the amount described in Table 13. The blended material was molded into two types of test pieces: one for mechanical properties, and the other for laser welding. Test pieces for mechanical properties were molded according to the ISO3167 on the Toshiba IS 170FIII injection molding machine, with cylinder temperature set at 290° C. and mold temperature at 60° C. Test pieces for laser welding, with dimension illustrated as FIG. 3, were molded on the Sumitomo Juki 75T injection molding machine, with cylinder temperature set at 280° C. and mold temperature set at 60° C.

Tensile strength and elongation were measured according to ISO527 and notched Charpy impact strength was measured according to ISO 179.

Laser welding was conducted using two pieces of the test pieces described above, combined as illustrated in FIG. 4. The Example U and V were used as Upper test piece and the Comparative Example W was used as Lower test piece. Diode laser (wavelength 940 nm, manufactured by Rofin-Sinar Laser GmbH) was irradiated with laser power at 50 W and regular speed, with 3 mm diameter. Tensile strength of the welded test pieces were measured on Autograph (manufactured by Shimazu Seisakusho) by pulling apart at 5 mm/minute and its maximum load was recorded.

TABLE 13

|  |  | Example U | Example V | Comp. Ex. W |
|---|---|---|---|---|
| Polyester pellets | kg | 4.9925 | 4.9925 | 4.99 |
| C.I. Solvent Blue 87 |  | 3.75 g |  |  |
| C.I. Solvent Red 179 |  | 2.25 g |  |  |
| C.I. Solvent Yellow 163 |  | 1.50 g |  |  |
| C.I. Solvent Green 3 |  |  | 4.50 g |  |
| C.I. Solvent Red 18 |  |  | 3.00 g |  |
| Carbon black |  |  |  | 10 g |
| Tensile strength | MPa | 135 | 135 | 150 |
| Elongation | % | 4.3 | 4.0 | 2.7 |
| Notched Charpy | kJ/m² | 13.0 | 13.0 | 10.5 |
| Laser Welding at 50 W |  |  |  |  |
| 5 m/min | Kgf | 150 | 145 | — |

The invention claimed is:

1. A thermoplastic resin composition for laser welding comprising:
    1) thermoplastic resin; and,
    2) a laser transmitting black colorant comprising a mixture of a) neutral anthraquinone dye which imparts colors of blue, violet or green, absorbs visible light with wavelength less than 700 nm and transmits a laser beam with wavelength at 800 nm to 1200 nm in the infra-red region with b) at least one other red dye which transmits with a wavelength at 800 nm to 1200 nm in infra-red region, selected from the group consisting of perinone dyes monoazo complex dyes and anthraquinone dyes.

2. The thermoplastic resin composition of claim 1 wherein said colorant comprises a mixture of said neutral anthraquinone blue dyes with said red dyes and further other yellow dyes.

3. The thermoplastic resin composition of claim 1 wherein said thermoplastic resin is polyamide or polyester.

4. The thermoplastic resin composition of claim 1 further comprising reinforcing agent.

5. A laser-transmitting article formed from the composition of claim 1.

6. An article formed by laser welding a laser-absorbing article with the laser-transmitting article of claim 5.

7. A laser-transmitting black colorant suitable for being mixed with a thermoplastic resin applied to a laser welding comprising a mixture of a) neutral anthraquinone dye which imparts colors of blue, violet or green, absorbs visible light with wavelength less than 700 nm and transmits a laser beam with wavelength at 800 nm to 1200 nm in mire-red region with b) at least other red dye which transmits the laser beam with wavelength at 800 nm to 1200 nm in infra-red region, selected from the group consisting of perinone dyes, monoazo complex dyes and anthraquinone dyes.

8. The laser-transmitting black colorant of claim 7 comprising said mixture of neutral anthraquinone blue dyes with red dyes and further yellow dyes.

* * * * *